United States Patent [19]

Zalevsky et al.

[11] Patent Number: 4,879,779

[45] Date of Patent: Nov. 14, 1989

[54] DEVICE FOR CLEANING A COOKING GRATE

[76] Inventors: Harvey A. Zalevsky, R.D. #2 Box 267E, Export, Pa. 15632; David A. Leah, P.O. Box 10971, Irvine, Calif. 92702

[21] Appl. No.: 255,704

[22] Filed: Oct. 11, 1988

[51] Int. Cl.$^4$ ............................................. A47L 17/00
[52] U.S. Cl. .................... 15/104.92; 15/160; 15/209 B; 15/210 R
[58] Field of Search ........... 15/104.92, 104.93, 104.94, 15/218.1, 166, 160, 210 R, 210 B, 209 B, 209 C, 221, 224, 184, 185, 244.1, 21 B, 21 C, 21 D, 236.01, 236.1, 230, 230.12, 146

[56] References Cited

U.S. PATENT DOCUMENTS

| | | | |
|---|---|---|---|
| 486,756 | 11/1892 | Bradshaw | 134/86 |
| 912,951 | 2/1909 | Gore | 312/284 |
| 1,652,875 | 12/1927 | Rein et al. | 15/210 B |
| 1,876,284 | 9/1932 | Fried | 15/160 |
| 1,890,374 | 12/1932 | Freund | 134/116 |
| 2,121,307 | 6/1938 | Swift | 15/210 R |
| 2,237,761 | 4/1941 | Leano | 15/160 |
| 2,617,132 | 11/1952 | Goller | 15/160 |
| 2,646,808 | 7/1953 | Yenne | 134/92 |
| 2,650,158 | 8/1953 | Eastman | 15/209 B |
| 2,715,291 | 8/1955 | Sweigert | 15/210 B |
| 2,778,044 | 1/1957 | Mikulski | 15/118 |
| 2,999,494 | 9/1961 | Richardson | 126/25 R |
| 3,428,988 | 2/1969 | Blackburn | 15/104.92 |
| 3,813,722 | 6/1974 | Sapochinik | 15/104.92 |
| 3,915,532 | 10/1975 | Ashton | 312/351 |
| 4,023,677 | 5/1977 | Wittner et al. | 206/229 |
| 4,069,536 | 1/1978 | Hartz et al. | 15/160 |
| 4,084,287 | 4/1978 | Ingram et al. | 15/210 R |
| 4,104,758 | 8/1978 | Stotler | 15/160 |
| 4,162,552 | 7/1979 | Winter | 15/21 B |
| 4,226,255 | 10/1980 | Tarrer | 134/117 |
| 4,365,380 | 12/1982 | Fassler | 15/236.01 |
| 4,380,839 | 4/1983 | Caradonna | 15/104.92 |
| 4,439,884 | 4/1984 | Giorni | 15/104.92 |
| 4,486,911 | 12/1984 | Beke | 15/21 R |
| 4,502,175 | 3/1985 | Hillis | 15/104.92 |
| 4,734,952 | 4/1988 | Parchment et al. | 15/104.92 |

FOREIGN PATENT DOCUMENTS

| | | | |
|---|---|---|---|
| 26790 | of 1909 | United Kingdom | 15/218.1 |
| 11643 | of 1910 | United Kingdom | 15/218.1 |

Primary Examiner—Harvey C. Hornsby
Assistant Examiner—Joseph S. Machuga
Attorney, Agent, or Firm—Nils H. Ljungman

[57] ABSTRACT

A device for cleaning a cooking grate includes a container having an interior cavity and an open top. The container is filled with cleaning fluid and has a pair of parallel side walls which have interior surfaces at least partially defining the interior cavity. The interior surfaces are separated by a predetermined distance which is greater than the thickness of the cooking grate for receipt of the cooking grate therebetween. Each one of the interior surfaces includes resiliently deflectable abrasion elements mounted thereon. The resiliently deflectable abrasion elements of each of the interior surfaces extends into the interior cavity toward the other of the interior surfaces. The cooking grate is installed within the interior and moved upwardly and downwardly as the resiliently deflectable abrasion elements remove undesired substance from the surface of the cooking grate. The container is made in separable halves for easy cleaning after use.

14 Claims, 1 Drawing Sheet

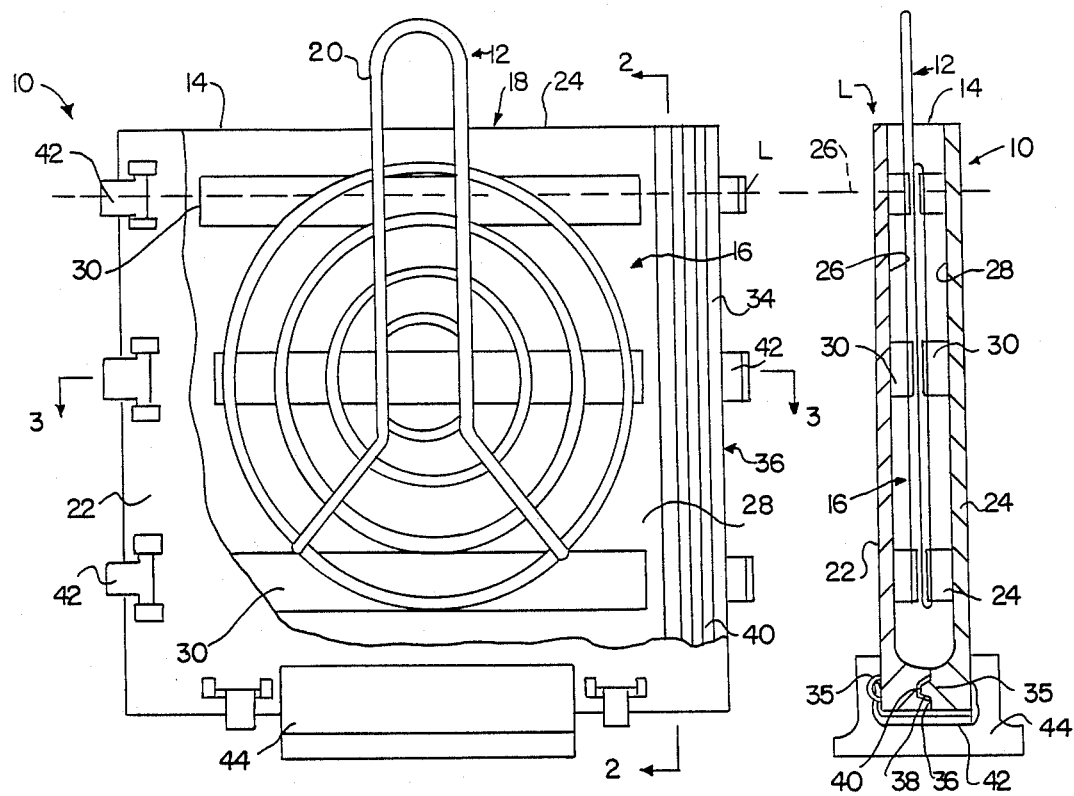
FIG. 1
FIG. 2
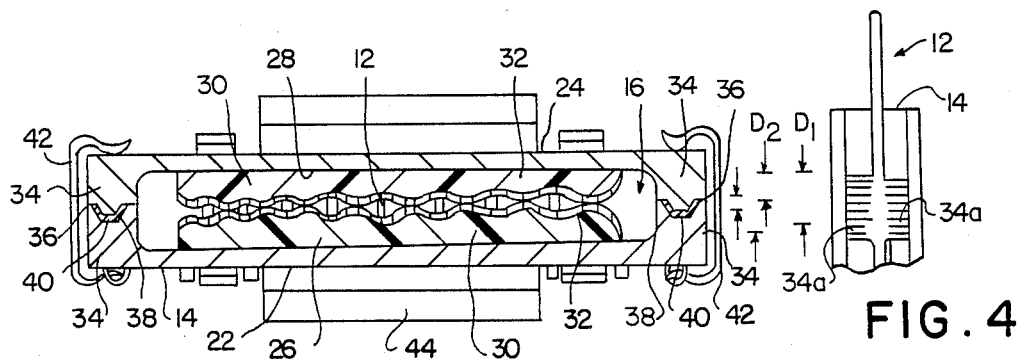
FIG. 3
FIG. 4

DEVICE FOR CLEANING A COOKING GRATE

BACKGROUND OF THE INVENTION

1. Field of the Invention

This invention relates to a device for cleaning a cooking grate and, more specifically, to such a device which is capable of effectively, efficiently and conveniently removing undesired cooking by-products and substances which tend to adhere to the surface of the cooking grate.

2. Description of the Prior Art

It is well known that cooking by-products and substances tend to collect and adhere to the surface of cooking grates or grills which are frequently used in outdoor barbeques, ovens, broilers or the like. As a result, the cooking grates or grills must be periodically cleaned to remove the cooking by-products and substances which tend to collect thereon. It is not uncommon for them to be cleaned with water pressure from hoses or, if necessary, by hand scrubbing to remove the substances which tend to remain on the surface of the cooking grate even under the pressure created by the water. Clearly, cleaning with the use of a hose or water pressure is not very efficient and, although it might be more efficient, hand scrubbing is often messy and undesirable.

U.S. Pat. No. 4,226,255 discloses a "Grill And Rack Cleaning Container" for the purpose of cleaning a cooking grill or grate of an outdoor barbecue. One of the embodiments disclosed therein includes a vertically oriented container with a closable top for soaking a grill in cleaning fluid within the container. There is no disclosure of how such soaking action would properly remove all undesired substance from the surface of the grill or how one would properly clean the interior of the container after its use. A second embodiment includes a container having two halves which are press fit together with the grill placed in the interior for soaking in cleaning fluid. Although this second embodiment would clearly be easier to clean after use, it is doubtful that press fitting the two halves together would be sufficiently reliable or convenient to provide such a sealed container for the soaking of a grill or grate therein.

Although the device disclosed in U.S. Pat. No. 4,226,255 appears to be more controlled and less messy than the use of water pressure or hand scrubbing, it is clearly more time consuming. The use of such a cleaning container is of questionable convenience because one must plan sufficiently far in advance to the use of the grill or grate to allow an adequate soaking time prior to the next use.

OBJECTS OF THE INVENTION

It is, therefore, an object of the invention to provide a device for cleaning a cooking grate which is relatively inexpensive and convenient to use.

It is a further object of the invention to provide such a device which can be used to effectively and efficiently clean the cooking grate while the device, itself, is capable of being effectively and efficiently cleaned after each use.

SUMMARY OF THE INVENTION

These and other objects of the invention are provided in a preferred embodiment thereof including a device for cleaning a cooking grate which has a predetermined thickness. The device includes a container having an interior cavity and an open top. The container is for containing a cleaning fluid within the interior cavity. The container has a pair of parallel side walls which have interior surfaces at least partially defining the interior cavity. The interior surfaces are separated by a predetermined distance which is greater than the predetermined thickness for receipt of the cooking grate therebetween. Each one of the interior surfaces includes resiliently deflectable abrasion elements mounted thereon. The resiliently deflectable abrasion elements of each of the interior surfaces extends into the interior cavity toward the other of the interior surfaces.

The preferred embodiment also includes the container having the side walls which are selectively separable to expose the interior surfaces and the resiliently deflectable abrasion elements thereof for cleaning. The side walls respectively include end edge portions and a bottom edge portion partially around the interior surface and the end edge portions and the bottom edge portion of the side walls are in corresponding sealing engagement to define the interior cavity.

The device also includes the end edge portions and the bottom edge portion of one of the side walls being respectively joined to the end edge portions and the bottom edge portion of the other of the side walls by a plurality of selectively releasable resilient clamps. There is a stand for supporting the container in an upright position during the cleaning of the cooking grate therein.

BRIEF DESCRIPTION OF THE DRAWINGS

FIG. 1 is a fragmentary, elevational view of the preferred cleaning device including various features of the invention.

FIG. 2 is a view of the device as seen along Line 2—2 of FIG. 1.

FIG. 3 is a view of the device as seen along Line 3—3 of FIG. 1.

FIG. 4 is a fragmentary view similar to that of FIG. 2 including another embodiment of the invention.

DESCRIPTION OF THE PREFERRED EMBODIMENTS

As basically seen in FIGS. 1, 2, and 3, the preferred device 10 for cleaning a cooking grate 12 includes a container 14. The container 14 has an interior cavity 16 and an open top 18 for the receipt and containment of a cleaning fluid therein. As seen in FIGS. 1 and 2, the cleaning fluid would be added to the interior cavity 16 to about the level as indicated by the dotted line L. The cleaning fluid may be simply hot water and some type of degreaser or some other watercleaner solution. Although the cooking grate 12 is the type which includes a handle 20, it should be understood that any number of other types of cooking grates could be cleaned in the preferred device 10. For example, if the cooking grate were the type which did not include a handle, pliers or tongs could be used to hold and move the grate during cleaning within the preferred device 10.

The preferred container 14 includes a pair of parallel side walls 22, 24 which respectively include interior surfaces 26, 28 which at least partially define the interior cavity 16. With the cooking grate 12 having a thickness T, the interior surfaces 26, 28 are separated by a predetermined distance D1 which is greater than the thickness T for receipt of the cooking grate 12 therebetween. The interior surfaces 26, 28 clearly include height and width dimensions which are greater than the corresponding dimensions of the cooking grate 12 but it should be recognized that the preferred device 10 could be provided in different height and width dimensions to accommodate grates of different sizes.

In order to properly clean the cooking grate 12 in the device 10, each of the interior surfaces 26, 28 includes some form of resiliently deflectable abrasion means mounted thereon to ensure proper cleaning and removal of undesired substances tending to adhere to the surface of the cooking grate 12. Specifically, the resiliently deflectable abrasion means of the preferred device 10 is in the form of three transversely extending resiliently deflectable elements 30 mounted directly to the interior surfaces 26, 28. The resiliently deflectable elements 30 are preferably formed of some type of resilient base material such as rubber or synthetic foam and includes a flexible abrasive material 32 secured to an outer surface portion of the resilient base. The flexible abrasive material 32 might include a plurality of small, hard particles imbedded in a rubber material which is bonded to some type of cloth or fabric backing. Such resiliently deflectable elements 30 would be similar to well-known scrub sponges or pads typically being sold for hand cleaning of pots and pans.

As seen in FIG. 4, an alternative resiliently deflectable abrasion means would be in the form of brushes 34a. Such brushes 34a could include bristles made of metal, plastic or some other suitable material or combination thereof.

The three resiliently deflectable elements 30 on each of the interior surfaces 26, 28 are in the form of horizontal strips which are vertically separated one from the other. Such a configuration allows the grate 12 to be inserted between the resiliently deflectable elements 30 so that upward and downward movement thereof would tend to dislodge and remove undesired cooking by-products and substances adhering to the surface. With the resiliently deflectable elements 30 being vertically separated, dislodged particles and substance could be suspended in the cleaning fluid between the elements 30 to prevent collection at the surface of the flexible abrasive material 32 or, for that matter, within the interior of the brushes 34a for the embodiment shown in FIG. 4.

The preferred configuration of the resiliently deflectable elements 30 of the device 10 includes each of the three resiliently deflectable elements 30 of one of the interior surfaces 26, 28 being aligned with similar elements 30 on the other of the interior surfaces 28, 26. In order to resiliently engage or surround the various parts of the cooking grate 12 between the resiliently deflectable elements 30, the preferred resiliently deflectable elements 30 extend from their respective surfaces 26, 28 at a distance D2 which is about onehalf of the distance D1 between the interior surfaces 26, 28. Such an undeflected distance D2 will allow insertion of the grate 12 therebetween but will cause deflection of the elements 30 to produce a force on the grate 12 to ensure that most of the surfaces thereof are cleaned and scrubbed by upward and downward movement of the cooking grate 12. With the resiliently deflectable elements 30 being aligned and in such close proximity, they will tend to interact to further facilitate removal of undesired substance from the surface of the cooking grate 12.

However, it should be recognized that other configurations for the resiliently deflectable elements 30 or, alternatively, for the brushes 34a could be employed depending on the pattern of the cooking grate used therein. For example, some of the elements 30 or brushes 34a may be at an angle to the horizon or the respective elements 30 or brushes 34a on the interior surfaces 26, 28 may be deliberately misaligned. Such misalignment or inclined orientation may facilitate insertion into and movement within the interior cavity 16 or may result in a better dispersion of the undesired substance after it is removed from the surface of the cooking grate 12.

As thus described, the preferred device 10 can be utilized to clean any number of cooking grate configurations by simple upward and downward movement with possible reorientation of the cooking grate therein in order to present a different direction of scrubbing to the cooking grate. After the cooking grate has been cleaned, it can be removed from the interior 16 of the device 10 for simple rinsing and subsequent use.

After the cooking grill 12 has been removed, the remaining cleaning fluid and cooking by-products suspended therein can be poured down a drain. In order to properly clean the interior cavity 16 of the container 14, the preferred container 14 includes the side walls 22, 24 which are selectively separable to expose the interior surfaces 26, 28 and the resiliently deflectable elements 30. In order for the container 14 to properly retain the cleaning fluid while still being capable of providing the desired access to the interior cavity 16, each of the side walls 22, 24 include a pair of end edge portions 34 and a bottom edge portion 35. The end edge portions 34 and the bottom edge portion 35 partially surround the interior surface 26 or 28 and combine to complete the definition of the interior cavity 16. Specifically, the end edge portions 34 and the bottom edge portion 35 of each of the side walls 22, 24 are in corresponding sealing engagement with each other to form the container 14 with an interior 16 capable of containing the cleaning fluid. The preferred corresponding sealing engagement includes tongue and groove means in the form of a ridge 36 which is disposed within a matching channel 38 with some type of sealing means 40 entrapped therebetween. Clearly, the ridge 36 and the channel 38 could be respectively used on the end edge portions 34 and bottom edge portion 35 of either of the side walls 22, 24.

In order to properly retain the side walls 22, 24 together in a sealed configuration, they are respectively joined at their corresponding end edge portions 34 and bottom edge portions 35 by selectively releasable coupling means. The preferred selectively releasable coupling means includes a plurality of resilient clamps 42 extending around the peripheral edges and bottom thereof. The clamps 42 are pivotly mounted to one of the side walls 22, 24 and can be swung in position to resiliently entrap the other of the side walls 24, 22. Clearly, any number of other means could be employed for conveniently joining the side walls 22, 24. For example, some type of velcro straps or elastic belts or loops could be used to provide sufficient force to ensure proper sealing engagement between the side walls 22, 24.

In any case, after use of the device 10 and removal of the cleaning fluid from the interior cavity 16 thereof, the side walls 22, 24 can be separated for cleaning of the interior surfaces 26, 28. With the side walls 22, 24 separated, they can be properly cleaned and soaked in a utility sink or may even be placed in an automatic diswasher for thorough cleaning.

Finally, in order to maintain the container 14 in an upright position throughout use and during subsequent rinsing of the cooking grate 12 after it has been cleaned, the preferred device 10 includes a temporary stand 44 for the container 14. The stand 44 simply allows the container 14 to be positioned within a groove thereof for support before, during and after cleaning of the cooking grate and prior to the container 14 being removed for cleaning.

The invention as described hereinabove in the context of a preferred embodiment is not to be taken as limited to all of the provided details thereof, since modifications and variations thereof may be made without departing from the spirit and scope of the invention.

What is claimed is:

1. A device for cleaning cooking by-products from a cooking grate having a predetermined thickness with a cleaning fluid, said device comprising:

a container having an interior cavity and an open top which are both dimensioned to receive the cooking grate;

said container being for containing the cleaning fluid within said interior cavity to a level adjacent said open top for substantially immersing the cooking grate;

said container having a pair of parallel side wall means;

said pair of said parallel side wall means having interior surfaces at least partially defining said interior cavity;

said interior surfaces being separated by a predetermined distance greater than said predetermined thickness for receipt of said cooking grate therebetween;

at least one of said interior surfaces having resiliently deflectable abrasion means mounted thereon;

said resiliently deflectable abrasion means of said at least one of said interior surfaces extending into said interior cavity toward the other of said interior surfaces for scrubbing the cooking by-products from the cooking grate;

said resiliently deflectable abrasion means including a plurality of resiliently deflectable elements having abrasive surface portions which are located outwardly of said at least one of said interior surfaces and within said interior cavity;

said each of said resiliently deflectable elements being elongated and extending across said at least one of said interior surfaces and being separated, by spaces within said interior cavity, from adjacent ones of said plurality of said resiliently deflectable elements on the same interior surface;

said spaces comprising means for collecting the cooking by-products being dislodged from said cooking grate by said resiliently deflectable elements;

said spaces being between said resiliently deflectable elements of said plurality;

means for selectively separating said side wall means for exposing said interior surfaces and said resiliently deflectable abrasion means thereof for cleaning away the dislodged cooking by-products adhering thereto.

2. The device according to claim 1, wherein both of said interior surfaces have said resiliently deflectable abrasion means mounted thereon.

3. The device according to claim 2, wherein said resiliently deflectable abrasion means extends from said interior surface at an undeflected distance of about one-half of said predetermined distance.

4. The device according to claim 2, wherein said resiliently deflectable abrasion means on said one of said interior surfaces is aligned with said resiliently deflectable abrasion means on said other of said interior surfaces.

5. The device according to claim 1, wherein said each of said resiliently deflectable elements includes a resilient base secured to said at least one of said interior surfaces and a flexible abrasive material secured to an outer surface of said resilient base.

6. The device according to claim 1, wherein said each of said resiliently deflectable elements includes at least one brush means.

7. The device according to claim 6, wherein said rush means includes bristles made of at least metal.

8. The device according to claim 6, wherein said brush means includes bristles made of at least plastic.

9. The device according to claim 1, wherein said side wall means respectively include end edge portions and a bottom edge portion partially around said interior surface and said end edge portions and said bottom edge portion of said side wall means include means for corresponding sealing engagement to define said interior cavity.

10. The device according to claim 9, wherein said means for corresponding sealing engagement includes tongue and groove means respectively on said end edge portions and said bottom edge portions.

11. The device according to claim 10, wherein said tongue and groove means includes a ridge disposed within a channel with sealing means entrapped therebetween.

12. The device according to claim 9, wherein said end edge portions and said bottom edge portion of one of said side wall means are respectively joined to said end edge portions and said bottom edge portion of the other of said side wall means by selectively releasable coupling means.

13. The device according to claim 12, wherein said selectively releasable coupling means includes a plurality of resilient clamping means.

14. The device according to claim 1, further including a stand for supporting said container in an upright position during said cleaning of said cooking grate therein.

* * * * *